Figure 1:
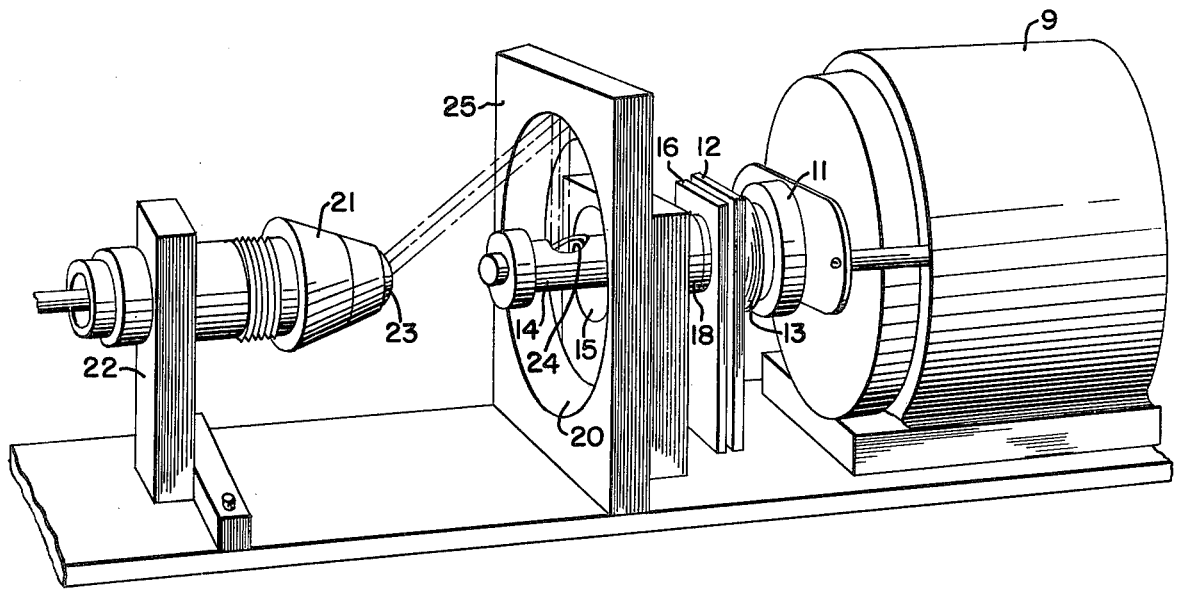

United States Patent [19]

Plotkin

[11] 4,193,297
[45] Mar. 18, 1980

[54] INFRARED FUZE TEST SIMULATOR

[75] Inventor: Gerald N. Plotkin, Silver Spring, Md.

[73] Assignee: The United States of America as represented by the Secretary of the Navy, Washington, D.C.

[21] Appl. No.: 300,409

[22] Filed: Jul. 31, 1963

[51] Int. Cl.² ............................................. F42C 21/00
[52] U.S. Cl. ....................................................... 73/167
[58] Field of Search ...................................... 73/5, 167

[56] References Cited
U.S. PATENT DOCUMENTS 2,360,053  10/1944  Gibbs .
2,378,327  6/1945   Riggen .

Primary Examiner—Verlin R. Pendegrass
Attorney, Agent, or Firm—R. S. Sciascia; A. L. Branning

EXEMPLARY CLAIM

1. An infrared fuze test simulator for simulating the infrared pattern which would be received by a spinning fuze in flight comprising
   a stationary mounting adapted to support a fuze having an infrared admission area,
   a variable high intensity infrared point source spaced from said fuze along the spin axis thereof,
   means for collimating the infrared radiation given off by said infrared point source into a beam and directing the beam along said spin axis,
   rotating mirror means between said fuze and said infrared point source and located on said spin axis for reflecting said beam radially outward from said axis and causing said beam to sweep through a circular path around said spin axis,
   stationary annular mirror means surrounding said rotating mirror means for receiving the beam from the rotating mirror means and directing the radiation upon said infrared admission area of the fuze at a predetermined angle with the fuze axis,
   means disposed in the path of said beam for attenuating the intensity of said beam,
   means disposed in the path of said beam for passing a desired wavelength of said beam,
   means disposed in the path of said beam for changing the cross-sectional shape and size of said beam,
   and shutter means disposed in the path of said radiation for controlling the rate of increase of radiation intensity at the infrared admission area.

9 Claims, 2 Drawing Figures

4,193,297

INFRARED FUZE TEST SIMULATOR

The invention described herein may be manufactured and used by or for the Government of the United States of America for governmental purposes without the payment of any royalties thereon or therefor.

The present invention relates to a test simulator and more particularly to an infrared fuze test simulator for testing infrared fuzes which will simulate the behavior of the fuze under various conditions of service.

In the field of infrared fuze test simulators, it has been the general practice to employ an annular hot plate in front of which was mounted a motor driven rotating disk with a small slit cut in the disk for the passage of radiation to the fuze. Although such devices have served the purpose, they have not proved entirely satisfactory under all conditions of service for the reason that the temperature of the simulated "hot target", such as a jet aircraft, could not be controlled exactly and was not uniform over the face of the hot plate. Also, the simulation of various shapes and rate of rise of radiation were not easily varied, and the intensity of the radiation received by the fuze could not be controlled easily.

The general purpose of this invention is to provide an infrared fuze test simulator which embraces all the advantages of similarly employed test simulators and possesses none of the aforedescribed disadvantages. To attain this, the present invention contemplates a unique infrared fuze test simulator in which a beam is directed from a black body radiation source through a lens, attenuator and filter adjacent thereto, into a rotating tube with a selected opening and rotatable diagonal mirror housed within the tube, which directs the beam on to a concentric conical mirror that reflects the moving beam into a "window" in the front of the stationary fuze. The test simulator can simulate spin of the fuze as it travels through the air, the appearance of various shapes of radiation patterns from different "hot targets", the intensity, the wavelength and the rate of rise of infrared radiation received therefrom. The test simulator also permits a fuze to be tested while remaining stationary, thus eliminating the hazards and difficulties associated with testing a rotating fuze.

An object of this invention is the provision of an infrared fuze simulator in which the temperature of the "hot body" can be controlled exactly.

Another object is to provide an infrared fuze test simulator in which the rise time and the shape of the radiation can be varied at will.

A still further object is the provision of an infrared fuze test simulator in which the intensity and the wavelength of the radiation can be easily controlled.

Figure 2:
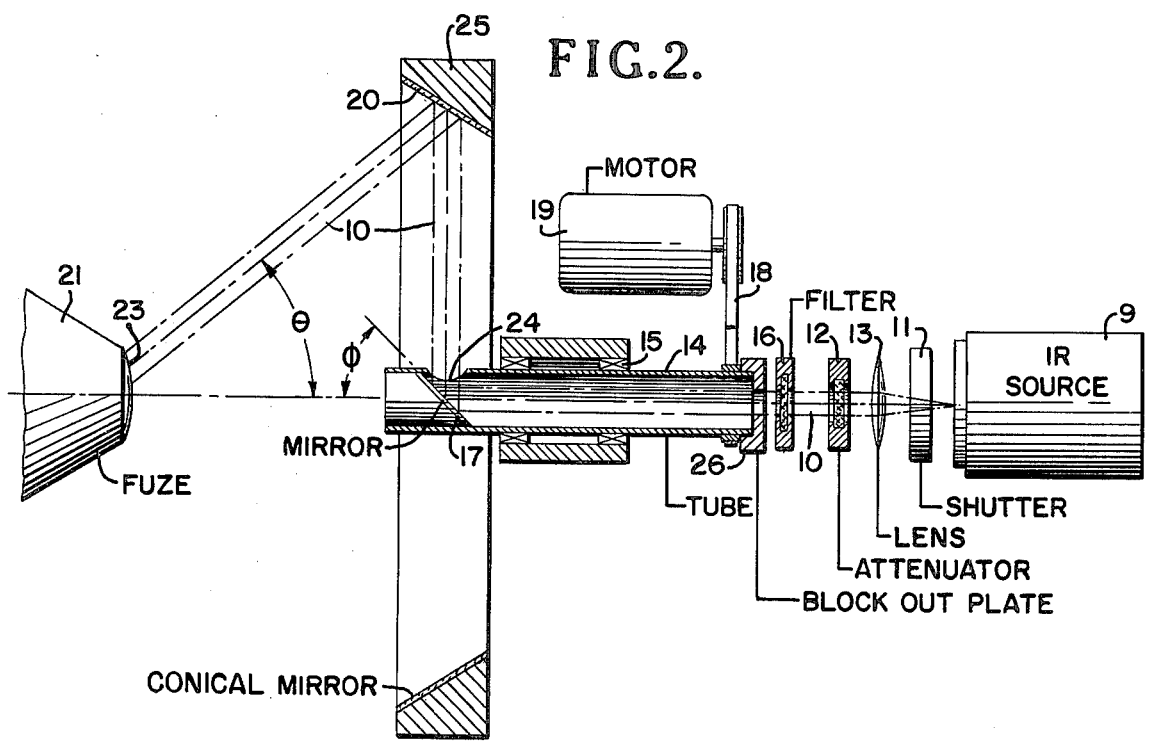

Other objects and features of the invention will become apparent to those skilled in the art as the disclosure is made in the following detailed description of a preferred embodiment of the invention as illustrated in the accompanying sheet of drawing in which:

FIG. 1 is a perspective view of a preferred embodiment of the infrared fuze test simulator; and FIG. 2 is a schematic view partly in section of the infrared fuze test simulator of FIG. 1.

Referring now to the drawing, wherein like reference characters designate like or corresponding parts throughout the several views, there is shown in FIGS. 1 and 2 a black body IR source 9 equipped with a temperature control. A shutter 11 can be attached to or placed in front of the IR source 9 to provide a controlled rate of increase or decrease of intensity of the beam at the fuze face. Placing the shutter 11 in the optical path permits simulation of the rise of IR energy on fast approach to the target. Different ranges and intensities of the target are simulated through the use of attenuators such as a calibrated wedge or screen 12 inserted in front of the IR source 9. A collimating lens, 13, for example an arsenic trisulphide lens, serves to make the IR beam 10 entering the attenuator approximately parallel. Filter 16 located in front of the IR source 9 passes a desired wavelength of the light beam 10. A diagonal mirror 17 is mounted at an angle $\phi$ with the axis of the fuze in a hollow rotatable tube 14 having a single aperture 24 therein for the passage of the beam 10 reflected from mirror 17. The center of the mirror 17 is coincident with the spin axis of the tube 14. The tube 14 is rotated at speeds corresponding to the spin of the projectile on bearings 15 by a variable speed motor and pully 19 and belt 18 engaging a second pulley on tube 14. The size and shape of the radiation beam can be varied by means of a selected block out plate or target image plate 26 insertable on the end of rotating tube 14. The mirror 17 directs the beam 10 at a predetermined angle from the tube axis toward a conical mirror 20 encircling it. The conical mirror 20 is mounted in a support 25 and is concentric with mirror 17. The beam 10 arriving from the spinning diagonal mirror 17 is reflected by the conical mirror 20 to thereby illuminate the fuze "window" or lens 23 variably in accordance with the instant position of the tube 14. The central ray of the beam 10 makes a predetermined optical viewing angle $\theta$ with the axis of the fuze. The angle $\theta$ between the central ray of beam 10 and the fuze axis is selected to coincide with the optical viewing angle of the fuze 21 since the fuze is designed so that it will actuate when the target is within the effective range and enters the viewing angle of the fuze. As can be seen in FIG. 1, a fixed mount 22 supports the fuze 21 at the end of the optical path. The mount is located so that radiation arrives at the correct angle and position on the fuze 21, the axis of which is coincident with the axis of the rotating tube 14.

It is to be understood that the shapes and curvatures of the mirrors 17 and 20 respectively, can be varied to give desired radiation at the fuze. The infrared fuze test simulator can be used if desired, without the shutter, lens, attenuator, filter and block out plate between the IR source and rotating tube or with any combination of them in any order or position and still provide signal inputs to test or actuate the fuze. Furthermore, the test fixture can be used to test various infrared scanning devices and homing devices, if so desired, and need not be limited to testing fuzes.

The infrared fuze test simulator operates in the following manner. Let it be assumed, by way of example, that the IR source 9 is energized and the motor 19 is started thereby rotating the tube 14 at a desired speed, for example 12,000 RPM, which is a typical spin velocity of a shell launched from a rifled cannon. The shutter 11 is opened for a predetermined time interval and the beam 10 travels through the collimating lens 13 which serves to make the beam 10 parallel. The beam now passes through the attenuator 12 which varies the intensity of the radiation and then through the filter 16 which allows a desired wavelength to pass therethrough. The beam now travels through the block out plate 26 which gives the desired size and shape of the IR beam. As can be seen in FIG. 2, the spinning diagonal mirror 17 reflects the parallel rays of the beam 10 from the tube axis toward the conical mirror 20. The conical mirror 20 now reflects the rays 10 so that the central ray converges on the fuze "window" 23 at the viewing angle θ of the fuze. The tube 14, which in this assumed example turns at 12,000 RPM, causes the reflected beam to travel the circumference of the conical mirror 200 times per second. The beam passing through the "window" excites infrared sensitive detectors located in the fuze and the signal received by the detectors is conveyed to an amplifier and firing circuit (not shown) which actuates the firing circuit of the fuze.

It can be seen that an infrared fuze test simulator has been provided which can simulate the spin of the fuze as it travels through the air, the appearance of various shapes of radiation patterns from different "hot targets" and the rate of rise of infrared radiation. An infrared fuze test simulator has been provided whereby the temperature of the "hot body" can be controlled exactly. Also, an infrared fuze test simulator has been provided in which the intensity and wavelength of the radiation can be easily varied.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. An infrared fuze test simulator for simulating the infrared pattern which would be received by a spinning fuze in flight comprising
    a stationary mounting adapted to support a fuze having an infrared admission area,
    a variable high intensity infrared point source spaced from said fuze along the spin axis thereof,
    means for collimating the infrared radiation given off by said infrared point source into a beam and directing the beam along said spin axis,
    rotating miror means between said fuze and said infrared point source and located on said spin axis for reflecting said beam radially outward from said axis and causing said beam to sweep through a circular path around said spin axis,
    stationary annular mirror means surrounding said rotating mirror means for receiving the beam from the rotating mirror means and directing the radiation upon said infrared admission area of the fuze at a predetermined angle with the fuze axis,
    means disposed in the path of said beam for attenuating the intensity of said beam,
    means disposed in the path of said beam for passing a desired wavelength of said beam,
    means disposed in the path of said beam for changing the cross-sectional shape and size of said beam,
    and shutter means disposed in the path of said radiation for controlling the rate of increase of radiation intensity at the infrared admission area.

2. An infrared fuze test simulator as recited in claim 1 where the rotating mirror means is a mirror mounted within a hollow apertured tube at a predetermined angle with the longitudinal axis of the tube and where the center of the rotating mirror is coincident with the spin axis of the fuze and the longitudinal axis of the tube.

3. An infrared fuze test simulator as recited in claim 2 wherein the stationary annular mirror means is concentric with the rotating mirror and comprises a conical mirror and support therefor, the support and rotating mirror being arranged in such a manner that when the beam reflected from the rotating mirror is directed from the spin axis of the fuze through the aperture in the tube on to the conical mirror, the beam is invariably reflected by the conical mirror into the infrared admission area at a predetermined viewing angle with the spin axis of the fuze.

4. An infrared fuze test simulator as set forth in claim 1 where the means for collimating the infrared radiation given off by the high intensity infrared point source is a lens.

5. An infrared fuze test simulator as set forth in claim 1 where the means disposed in the path of said beam for changing the cross-sectional shape and size of said beam is a block out plate mounted on one end of said rotating tube and having an aperture therein through which the beam passes.

6. An infrared test simulator for simulating the infrared pattern which would be received by a spinning fuze in flight comprising
    a stationary mounting adapted to support a fuze having an infrared admission "window",
    a high intensity infrared point source spaced from said fuze along the spin axis thereof,
    means disposed in the path of radiation emanating from said infrared point source for collimating the radiation into a parallel beam and directing the parallel beam along the fuze axis.
    rotating mirror means between said fuze and said infrared point source located on said spin axis for reflecting said beam radially outward from said spin axis and causing said beam to sweep through a circular path around said spin axis,
    stationary annular mirror means surrounding said rotating mirror means for reflecting the beam upon said infrared admission "window" of the fuze at a predetermined angle with the fuze axis,
    and shutter means disposed in the path of said radiation between said fuze and infrared point source for controlling the rate of increase of radiation intensity at the infrared admission "window".

7. An infrared fuze test simulator as set forth in claim 6 including means disposed in the path of said beam for attenuating the intensity of the beam from said infrared source.

8. An infrared fuze test simulator as set forth in claim 6 including means disposed in the path of said beam for changing the cross-sectional size and shape of said beam.

9. An infrared test simulator as set forth in claim 6 including means disposed in the path of said beam for passing only a desired wavelength of said beam.

* * * * *